July 19, 1932.  F. P. RYDER  1,867,955
STRING BEAN HARVESTER
Filed Nov. 9, 1927
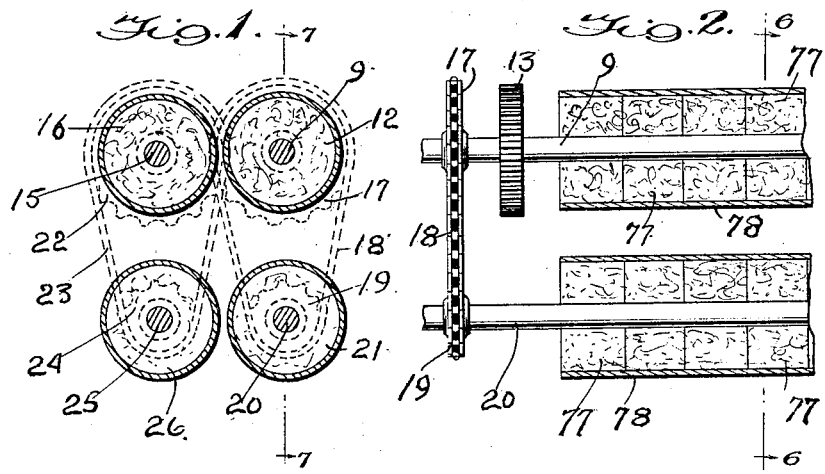
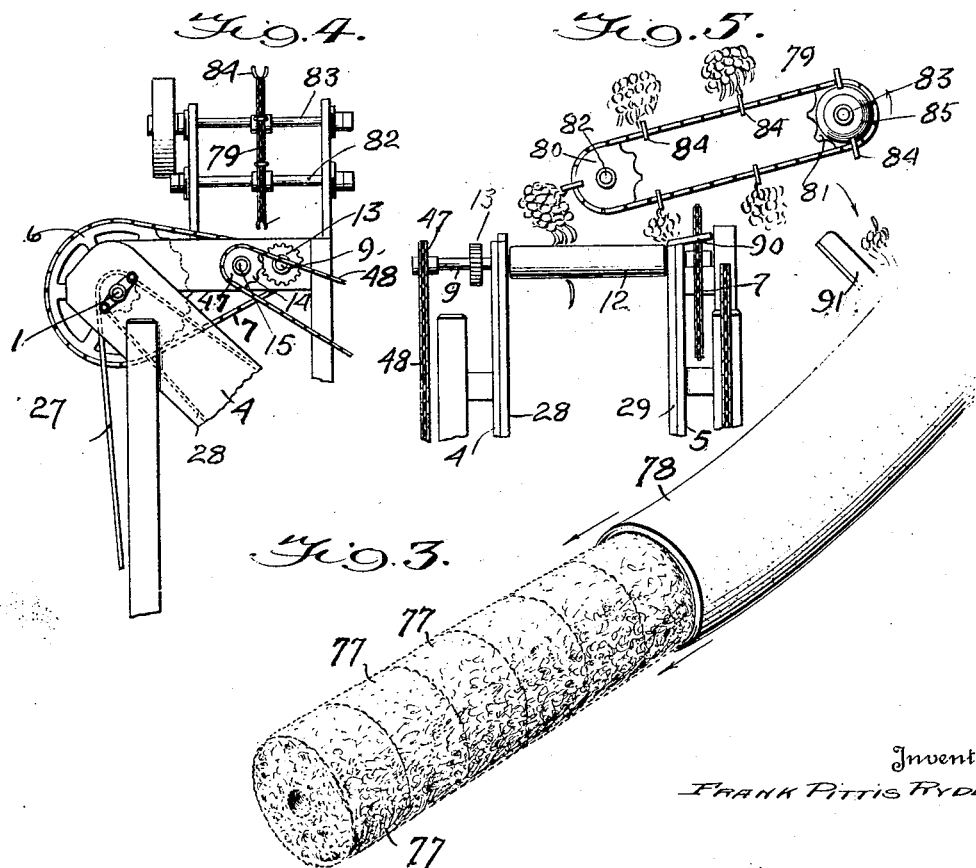
Inventor
FRANK PITTIS RYDER
By A. P. Greeley
Attorney Patented July 19, 1932

1,867,955

UNITED STATES PATENT OFFICE

FRANK PITTIS RYDER, OF NIAGARA FALLS, NEW YORK

STRING BEAN HARVESTER

Application filed November 9, 1927. Serial No. 232,119.

My invention relates to bean harvesting machines adapted to pick or strip from the vines or bushes on which they are grown the bean pods adapted for use in canning as string beans, that is, pods in which the beans are more or less completely formed but have not become hard and in which the enclosing pods are not dried out but are tender, full of moisture and adapted for use as food.

Bean pods in this condition are canned in large quantities as string beans. For canning purposes these string beans are generally grown on bushes rather than on climbing vines. These bushes are generally planted in rows 34 inches apart and during the season at intervals of about two weeks laborers pick from the bushes all beans that are sufficiently developed to can. Such beans range in size from 10/64ths to 30/64ths of an inch in thickness and a field will generally be picked over three times, the first picking yielding 35% of the crop, the second, 45% and the third 20%. When so picked the beans are quite free from leaves and broken stalks and are ready to be snipped and assorted for canning.

On account of the expense of hand picking and the difficulty of securing the laborers required to pick the string beans during the relatively short time during which the bean pods are in proper condition for canning, it has been considered desirable to devise some means for harvesting the beans by machines adapted for operation by power. No satisfactory machine for this purpose has yet been offered to the string bean packers.

I find that when it is not necessary to have the laborers pass through a bean field to pick the beans without injury to the bushes; that it is practicable to plant the rows 24 inches apart instead of 34 inches, and to cut the bushes off close to the root with mowing machines commonly in use on farms and to transport these bushes to the canning factory with the beans attached.

By planting the rows 24 inches apart instead of 34 inches, and cutting them at a time between that of what would normally be the first and second hand picking, it is possible to secure from an acre of land bushes containing as great a weight of beans suitable for canning as would have been secured from the same land by three successive hand pickings.

It is the object of my present invention to provide a method of operation and mechanism that will strip the beans from the vines as cut from the field and deliver these beans free from leaves and parts of stalk and dirt ready for snipping and assorting for canning.

My process is carried out in three stages:

First; the beans, and incidently the leaves, are stripped from the stalks without injury to the tender beans. This is accomplished by stripping rolls, having peculiar construction and properties later described which stripping rolls may grip the beans with sufficient force to pull them from the stalks yet not with sufficient force to injure them when the stalks are retarded in their passage through the stripping rolls either by a pair of gripping rolls or by a series of clamps engaging the stalks.

Second: Beans and stalks together are separated from the leaves.

With the objects above outlined and other objects hereinafter explained in view my invention consists in and comprises the method and construction and combination of elements hereinafter described and claimed.

Figure 1 is a detail vertical sectional view on an enlarged scale of the gripping rolls and the stripping rolls on line 6—6 of Figure 2.

Figure 2 is a vertical sectional view on line 7—7 of Figure 1.

Figure 3 is a perspective view of a gripping or stripping roller in process of construction.

Figure 4 is a fragmentary front view of a series of clamps for presenting bushes to a pair of stripping rolls and retarding the stalks in their passage through the stripping rolls.

Figure 5 is a side view of the same.

In the drawing 12 and 16 indicate gripping rollers carried by shafts 9 and 15 and these gripping rollers in order to grip the bean stalks which vary considerably in size and to permit the tender bean pods to pass between them without injury must be sufficiently resilient to grip a stalk with considerable force and yet be capable of so yielding as to permit a bean pod to pass without bruising. That is the material of the roller must be such that the resistance to compression will be comparatively slight and as nearly as possible constant to whatever extent the compression may be carried. The numerals 21 and 26 indicate stripping rollers carried by shafts 20 and 25 and these stripping rollers in order to pull a bean pod with sufficient force to break the brittle stem connecting it with the stalk which is being retarded between the gripping rollers and yet slide over a stalk still held between the gripping rollers or a bean, one end of which has not passed completely through the gripping rollers must be sufficiently resilient to grip the bean pods with sufficient force to pull them from a stalk held by the gripping rollers yet yield and slide over the stalks passing between them and also to slip over a bean still held on one end by the gripping rollers; without breaking or injuring it. Rollers of solid rubber or of the composition used in the printing art for inking rollers are not suitable for use as stripping rollers for the the reason that such rollers while offering slight resistance to slight compression offer greatly increased resistance to the greater compression. The gripping rollers of my invention are shown in detail in Figure 2 and in the process of construction in Figure 3. These rollers are formed by cutting discs from rubber sponge, that is, rubber which has, before vulcanizing, been mixed with baking powder or like material adapted to give off gas when heated and then baked so as to produce a highly porous mass of great resiliency. As this cannot conveniently if at all, be so baked as to form a satisfactory roller, it is necessary to cut these discs from a mass of the finished material. These discs are centrally perforated so as to fit over a shaft to form a roller. In order that the roller may have a smooth working surface and not be torn as it slips over stalks or beans, a rubber cover 78 of thin pure gum is drawn over the roller formed of these discs 77. The roller thus formed will yield evenly to relatively great compression and to relatively slight compression, and will exert a uniform pull on objects of greatly varying thickness and will slip over stalks or bean pods without injury either to itself or the stalks and the bean pods. The gripping rollers carried by shafts 9 and 15 are so arranged that their surfaces are in contact or nearly in contact and the stripping rollers 21 and 26 are so arranged that their surfaces are in contact or nearly in contact. The gripping rollers rotate at relatively slow speed and act to draw the bean bushes with pods attached inward and to feed them to the stripping rollers which as above described, rotate at a higher speed. Stalks and pods are first gripped by the slow moving gripping rollers, then, while still held and retarded by these rollers, they are seized by the fast running stripping rollers which tend to pull them from the gripping rollers. The stripping rollers are made so they exert a somewhat less gripping action on the stalks and pods than do the gripping rollers. When a stalk or a bean is still between the gripping rollers the stripping rollers will slip over it without injury to the stalk or bean. As soon as a bean pod has passed completely through the gripping rollers which are still retarding the stalk to which it is attached the pull of the faster running stripping rollers breaks the comparatively weak and brittle stem connecting it with the stalk so that when the pods and stalks pass through the two setse of rollers they have been pulled one from the other. A small percentage of beans may lie so close to the end of the stalk that the stalk is released by the gripping rollers before the bean is pulled from the stalk but this percentage is small and insignificant since most of the beans develop on the stalk some distance above the root end.

At the same time and in the same manner as the bean pods are pulled from the stalks so are large quantities of leaves separated from the stalks. The resultant mass of material falls onto any convenient separating means or into any convenient receptacle.

While it is preferred to use gripping and stripping rollers as above described a single pair of stripping rollers will do effective work when the bean stalks are held and retarded in their passage through the stripping rollers either by hand or by moving clamps as for instance in the construction shown on Figures 4 and 5 in which an endless chain 79 carried on sprocket gears 80 and 81 on shafts 82 and 83 is arranged above and parallel to the axes of the stripping rollers. This chain carries clamps 84 adapted to be opened by a disc 85 on shaft 83 to permit the root end of the stalk or bean bush to be inserted in them, the clamp closing on the stalk as it leaves disc 85 and carrying it forward so that as the bush passes around sprocket gear 80 it will be presented to the stripping rollers which will strip off the bean pods. The stalk will then be drawn out from between the stripping rollers and released when the clamp reaches the lower side of disc 85.

Having thus described my invention, what I claim is:

1. A machine for stripping string beans from the bushes on which they are grown comprising a pair of parallel elastic gripping rollers and means for rotating them in opposite directions so as to draw in between them bean pods and bushes, a pair of elastic stripping rollers arranged in line with the gripping rollers, and means for rotating the stripping rollers at a surface speed greater than the surface speed of the gripping rollers so that they will act to move the bean pods in the same direction in which they are moved by the gripping rollers.

2. A machine for stripping string beans from the bushes on which they are grown comprising a pair of parallel elastic gripping rollers and means for rotating them in opposite directions so as to draw in between them bean pods and bushes, a pair of elastic stripping rollers arranged below and in line with the gripping rollers, and means for rotating the stripping rollers at a surface speed greater than the surface speed of the gripping rollers so that they will act to move the bean pods in the same downward direction in which they are moved by the gripping rollers.

3. A machine for stripping string beans from the bushes on which they are grown comprising a pair of parallel elastic gripping rollers and means for rotating them in opposite directions so as to draw in between them bean pods and bushes, a pair of elastic stripping rollers arranged below and in line with the gripping rollers, and means for so rotating the stripping rollers than their surface speeds will be greater than the surface speeds of the gripping rollers and in such direction that they will act to move the bean pods in the same direction in which they are moved by the gripping rollers.

4. A machine for stripping string beans from the bushes on which they are grown comprising a pair of parallel resilient gripping rollers having their axes in a substantially horizontal plane and having their surfaces in the horizontal plane of their axis in contact or nearly in contact, means for rotating said gripping rollers at a predetermined speed, a pair of parallel resilient stripping rollers arranged below the gripping rollers having their adjacent surfaces in contact or nearly in contact, and means for so rotating the stripping rollers that their operating surfaces will move at a speed greater than that of the surfaces of the gripping rollers.

5. A machine for stripping string beans from the bushes on which they are grown comprising a pair of parallel resilient gripping rollers having their adjacent surfaces in contact or nearly in contact, means for rotating said gripping rollers at a predetermined speed, a pair of parallel resilient stripping rollers arranged below the gripping rollers having their adjacent surfaces in contact or nearly in contact, and means for so rotating the stripping rollers that their operating surfaces will move at a speed greater than that of the surfaces of the gripping rollers so that the bean pods will be delivered endwise from the stripping rollers.

In testimony whereof, I hereunto affix my signature.

FRANK PITTIS RYDER.